United States Patent
Maynard et al.

[11] Patent Number: 6,052,181
[45] Date of Patent: Apr. 18, 2000

[54] MULTIPLE SIMULTANEOUS LASER-REFERENCE CONTROL SYSTEM FOR CONSTRUCTION EQUIPMENT

[75] Inventors: Kurtis L. Maynard, Gainesville, Ga.; James M. Janky, Los Altos, Calif.

[73] Assignee: Trimble Navigation Limited, Sunnyvale, Calif.

[21] Appl. No.: 09/108,853

[22] Filed: Jul. 1, 1998

[51] Int. Cl.[7] .............................. G01C 1/00; G01B 11/26
[52] U.S. Cl. ........................................ 356/147; 356/152.1
[58] Field of Search ................................. 356/147, 152.1, 356/1, 4, 141.1; 364/424.027, 424.051, 443, 449.1, 449.3, 449.4, 449.7, 449.9

[56] References Cited

U.S. PATENT DOCUMENTS

| | | | |
|---|---|---|---|
| 4,053,238 | 10/1977 | George et al. | 356/249 |
| 4,648,133 | 3/1987 | Vilnrotter | 455/608 |
| 4,700,301 | 10/1987 | Dyke | 364/424 |
| 4,866,738 | 9/1989 | Wiesmann et al. | 375/23 |
| 4,933,928 | 6/1990 | Grant et al. | 370/3 |
| 5,100,229 | 3/1992 | Lundberg et al. | 356/1 |
| 5,189,484 | 2/1993 | Koschmann et al. | 356/138 |
| 5,206,909 | 4/1993 | Gates | 380/59 |
| 5,471,049 | 11/1995 | Cain | 250/208.2 |
| 5,477,459 | 12/1995 | Clegg et al. | 364/460 |
| 5,486,690 | 1/1996 | Ake | 250/206.1 |

OTHER PUBLICATIONS

Meteor Burst Communications: Theory and Practice by Donald L. Schilling, Mar. 1993, ISBN: 0471522120.
Meteor Burst Communications by Jacob Z. Schanker, Oct. 1990, ISBN: 089006444X.

*Primary Examiner*—Robert H. Kim
*Assistant Examiner*—Michael P. Stafira
*Attorney, Agent, or Firm*—Thomas E. Schatzel; Law Offices of Thomas E. Schatzel

[57] ABSTRACT

A number of laser beam stations emit vertically separated parallel planes and/or ray-planes of laser light that can be discriminated by their respective plane elevations, modulation of the laser light, time synchronizing, etc. Identifying the laser plane would also imply an identification of the source laser beam station, and thus a precise indication of the elevation at the point of optical intercept. Alternatively, a single laser beam station is used that can emit several different monochromatic color planes and/or ray-planes of laser light. Monochromatic laser diodes, for example, are used for point-light sources and rotating or on-end conical mirrors are used to convert the diode laser light to the required monochromatic color planes and/or ray-planes of laser light. Receivers, generally held on masts attached to motor grader, bulldozer, loader, and excavator machines are used to sense the vertical reference position of the monochromatic color planes and/or ray-planes of laser light, relative to the earth cutting blade of the machine. Fixed-color filters, color filter wheels, and/or linear array photo-detectors are used to discriminate amongst the colors and to exactly sense the plane of intersection with the machine. The results of the sensing are either displayed to an equipment operator for manual adjustment of the blade to an automatic servo control system connected to hydraulically control the blade.

12 Claims, 4 Drawing Sheets

MULTIPLE SIMULTANEOUS LASER-REFERENCE CONTROL SYSTEM FOR CONSTRUCTION EQUIPMENT

BACKGROUND OF THE INVENTION

1. Field of the Invention

The invention relates generally to laser alignment systems, and more particularly to construction-machine laser automatic control systems for bulldozers, graders, scrapers, excavators and other fine grading machines. Specifically, the present invention relates to-methods and equipment for using several laser reference planes simultaneously for use by one or several pieces of construction equipment.

2. Description of the Prior Art

Some flatwork contractors measure grades with transits and graduated sticks, then string lines and rake base material by hand to meet grade tolerances. A laser-beacon with a rotating light beam output may transmit a signal to indicate the benchmark for a desired grade. Mast-mounted receivers are connected to each end of a grader blade and use such signal to hydraulically raise or lower the blade to match a pre-set grade. An operator simply operates the grader and angles the blade to direct sub-base material right or left as needed, while the laser controls blade height. The laser can promptly make numerous blade adjustments to produce a surface within close tolerance of the grade. Available laser equipment includes a self-leveling laser-beacon that enables dial-in dual-slope grades for drainage. A control panel is mounted on the grader to assist the operator in monitoring progress. If manual control is desired, switches on the grader's steering levers provide fingertip control of the blade in any one or more of multiple directions.

U.S. Pat. No. 4,053,238 for a Self-Leveling Construction Alignment Laser, issued to Lyndell George, et al., Oct. 11, 1977, discloses a system for projecting and using a light beam as a reference line for construction. The system includes a light beam projection device mounted in a housing. A light path compensator is positioned within the housing and intercepts the beam of light emitted by the light beam projecting device and automatically corrects slight deviations of the light beam from true horizontal. A vertically adjustable leg is attached to the front end of the housing and a horizontally pivotable leg is attached to each side of the housing near the rear end of the housing to enable leveling and centering of the housing in a conduit or positioning and leveling on any surface. An indicator, readable from the rear of the housing, is provided for indicating the grade at which the light beam is projected. Structure is connected between the support legs and housing for rotating the housing in a horizontal plane to provide azimuth adjustment of the light beam projected therefrom.

Machine control through XYZ positioning is in its early stages. On-the-fly real-time-kinematic (OTF-RTK) GPS is useful for rough grading, and robotic total stations can satisfy the special requirements of fine grading. Such technologies provide an early indication of what can be achieved with "stakeless surveying" Prior art approaches are not capable of controlling multiple machines on large projects and that require fine grading.

SUMMARY OF THE PRESENT INVENTION

It is therefore an object of the present invention to provide a system for issuing and discriminating amongst several independent laser reference planes.

It is another object of the present invention to provide a method for multiplexing and demultiplexing several independent laser reference planes in real-time at a job construction site.

Briefly, a system embodiment of the present invention comprises a number of laser beam stations that respectively emit vertically separated parallel planes and/or ray-planes of laser light that can be discriminated by plane elevations, modulation of the laser light, time synchronizing, etc. Identifying the laser plane would also imply an identification of the source laser beam station. Alternatively, a single laser beam station is used to emit several different monochromatic color planes and/or ray-planes of laser light. Monochromatic laser diodes, for example, are used for point-light sources and rotating or on-end conical mirrors are used to convert the diode laser light to the required monochromatic color planes and/or ray-planes of laser light. Receivers, generally held on masts attached to motor grader, bulldozer, loader, and excavator machines are used to sense the vertical reference position of the monochromatic color planes and/or ray-planes of laser light, relative to the earth cutting blade of the machine. Fixed-color filters, color filter wheels, and/or linear array photodetectors are used to discriminate amongst the colors and to exactly sense the plane of intersection with the machine. The results of the sensing are either displayed to an equipment operator for manual adjustment of the blade, or to an automatic servo control system connected to hydraulically control the blade.

An advantage of the present invention is that a system is provided that can allow multiple independent laser reference systems to operate simultaneously at a single job-site.

Another advantage of the present invention is that a system is provided that allows multiple reference planes to be established over a job-site such that the grading in particular areas can be selectively varied.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMODIMENTS

Figure 1:
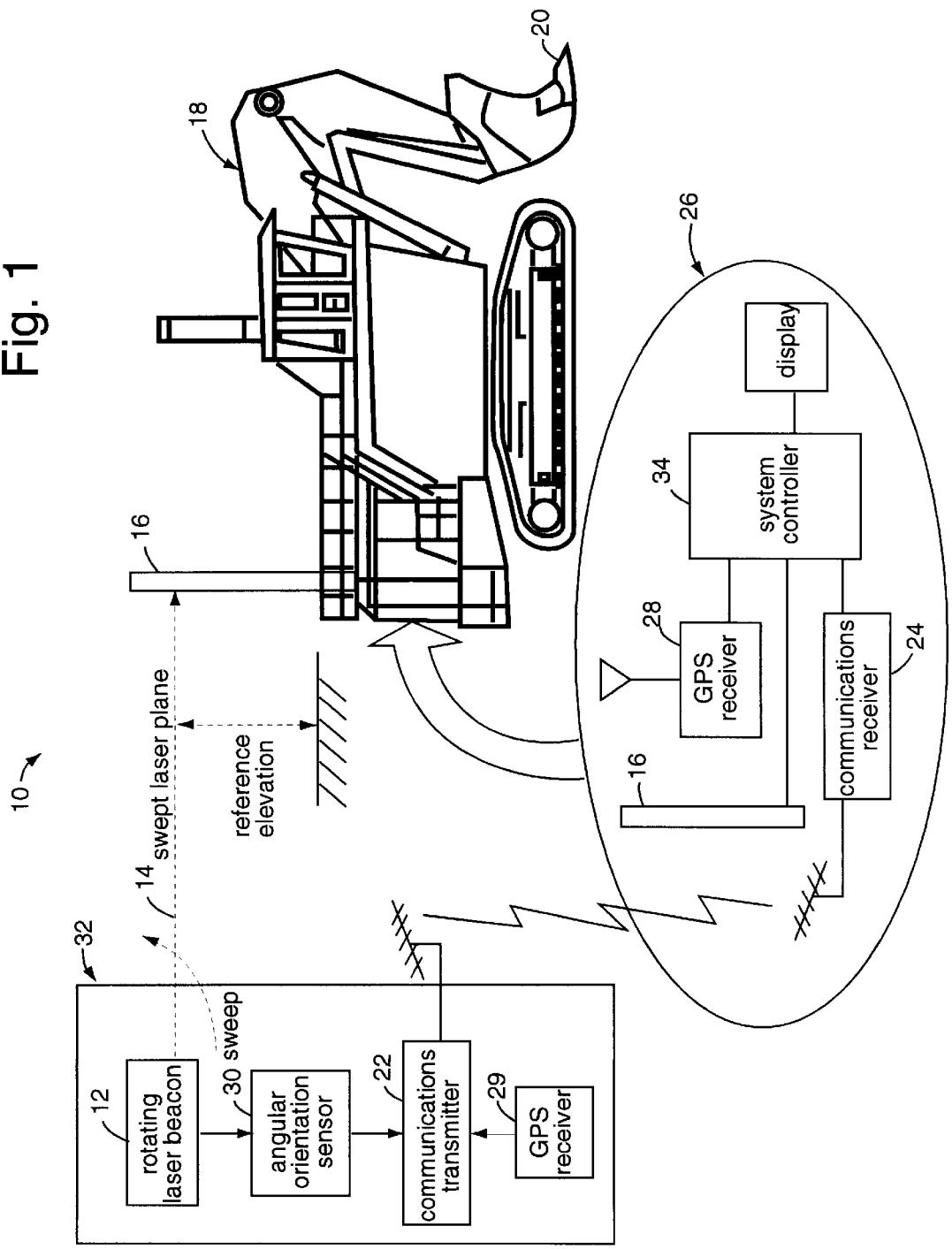
FIG. 1 is a diagram of a multiple-laser elevation-reference system embodiment of the present invention.

FIG. 1 illustrates a multiple-laser elevation-reference system embodiment of the present invention, and is referred to herein by the general reference numeral 10. A plurality of multiple rotating lasers are represented by a laser beacon 12 that produces a swept plane of laser light 14. Typically such plane 14 is oriented normal to vertical. Such laser beacons 12 are used to define elevation reference planes on a construction site. The light planes 14 are intercepted by a mast-mounted linear-array optical detector 16 attached to a piece of construction equipment 18, e.g., rod graders or other earth moving equipment. The intercept height permits such construction equipment 18 to do accurate surface contouring on the construction site. The use of multiple lasers requires that the grader must know which particular laser beam 14 is being intercepted and the corresponding reference height, or altitude. The reference height may be pre-associated with particular laser beacons 12. Thus identification of the laser beacon 12 that produced the intercepted laser beam 14 is a fundamental thing to be determined in a mixed field of several such beacons and where rotating beams each represent a unique elevation.

In one embodiment of the present invention, the rotating laser beam 14 is amplitude modulated with an identifying data stream and other user data that is received by mast-mounted linear-array optical detector 16. The data is thereafter demodulated in a very short time after the beam passes by the mast. A particular detector in the mast-mounted linear-array optical detector 16 indicates the height of beam interception relative to a grading blade or scoop 20. The data sent can include the beam identity, the reference elevation of the rotating laser plane, beacon position, accurate time, etc. A radio communications channel, e.g., a Trimble TRIM-TALK packet radio, comprising a transmitter 22 and a receiver 24 can also be used to send beam identification and operational information from the rotating laser beacon 12 to an equipment package 26 on the equipment 18. In such a case, the rotating laser beam 14 itself does not need to be modulated.

Once a communications channel of any type is established between each rotating laser beacon 12 and the construction equipment 18 on site, the time of interception can be used to identify the source if the rotating beam is swept around the points of the compass at precise times. A global positioning system (GPS) receiver 28 or 29 can be used to provide a highly accurate common time reference that is established at both the rotating laser's radio transmitter 22 and at a radio receiver 24 located on the construction equipment package 26.

For example, using an ordinary magnetic compass, an arbitrary pointing angle reference is established for the rotating laser beams, such as north. No greater accuracy is believed to be needed. An electrical switch 30 is mechanically connected to the rotating mechanism of the beacon 12 and can be used to generate a short reference pulse each 0° of laser beam 14 rotation. A rotating laser beacon assembly 32 is then placed so that such short reference pulse is issued each time the rotating laser beam passes through north.

Such switch-activation is used to precisely time-mark when the rotating laser beam was pointed north. The time-mark established is transmitted in a data packet to a system controller 34 so it can discriminate amongst several different laser beams 14 that may have been intercepted by the mast-mounted linear-array optical detector 16. A log is built-up for all the rotating lasers on the site, so the road grader controller has a running list of the times each rotating laser was pointed north. It is therefore not necessary for the periods of rotation to be precise. If four such beacons 12 are used at a construction site, e.g., at each of four outside corners, then the 360° of the compass will be parsed amongst them. For example, only the beam 14 from the beacon 12 that is in the south-east corner will be intercepted by a mast-mounted linear-array optical detector 16 when it is sweeping between 270° and 360° (west through north).

Knowing the period of rotation of each rotating laser, which can be different from unit to unit, the system controller on the grader can determine what the time period window is in which it should expect an interception of the rotating laser beam. Further, if the system controller knows where the rotating lasers are located on the construction site relative to the grader's own position, then the system controller 34 can estimate the time the beam will intercept the mast by calculating the rough angle from north as measured from the rotating laser to the grader. Knowing the period of rotation, the fraction of a circle that this rough angle represents, multiplied by the rotation period, gives the expected time of intercept for a given rotating laser, relative to the time the rotating laser was pointing north.

With such method, the rotating laser beams 14 do not have to be synchronized with one another. But by doing so, the calculations made by the system controller become somewhat easier. For example, a start-rotation signal may be issued to the beacons 12 from the road grader system controller 34.

Figure 2:
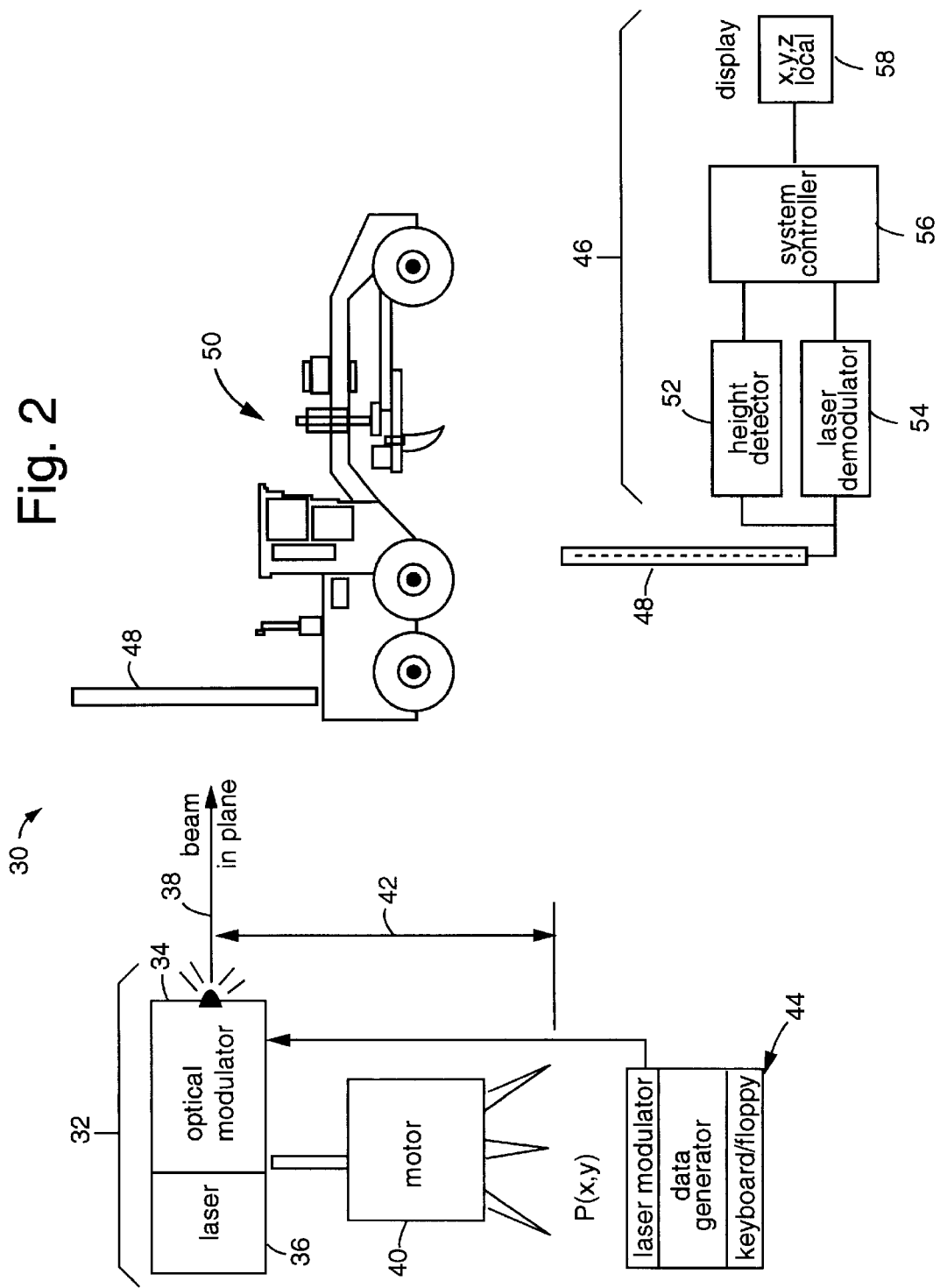
FIG. 2 is a block diagram of a rotating laser reference system with an optical modulator used to identify the beacon and to communicate data to a piece of construction equipment.

FIG. 2 represents a system 30 in which a rotating laser beacon 32 includes an optical modulator 34. A laser source 36 is rotated in a constant-elevation plane 38 by a spindle motor 40. The constant-elevation plane 38 has a known elevation 42. A computer system 44 provides user and operational data to the optical modulator for consumption by a mobile unit 46. An optical detector mast 48 is used to make visual observations of the laser signals generated by the beacon 32 and is typically mounted on a piece of construction equipment 50, e.g., an earth grader. A height detector 52 is used to determine the particular vertical spot on the mast 48 which has observed a laser signal. A laser demodulator 54 extracts informational data from the laser signal. A system controller 56 gathers all the information available for a user display 58.

Figure 3:
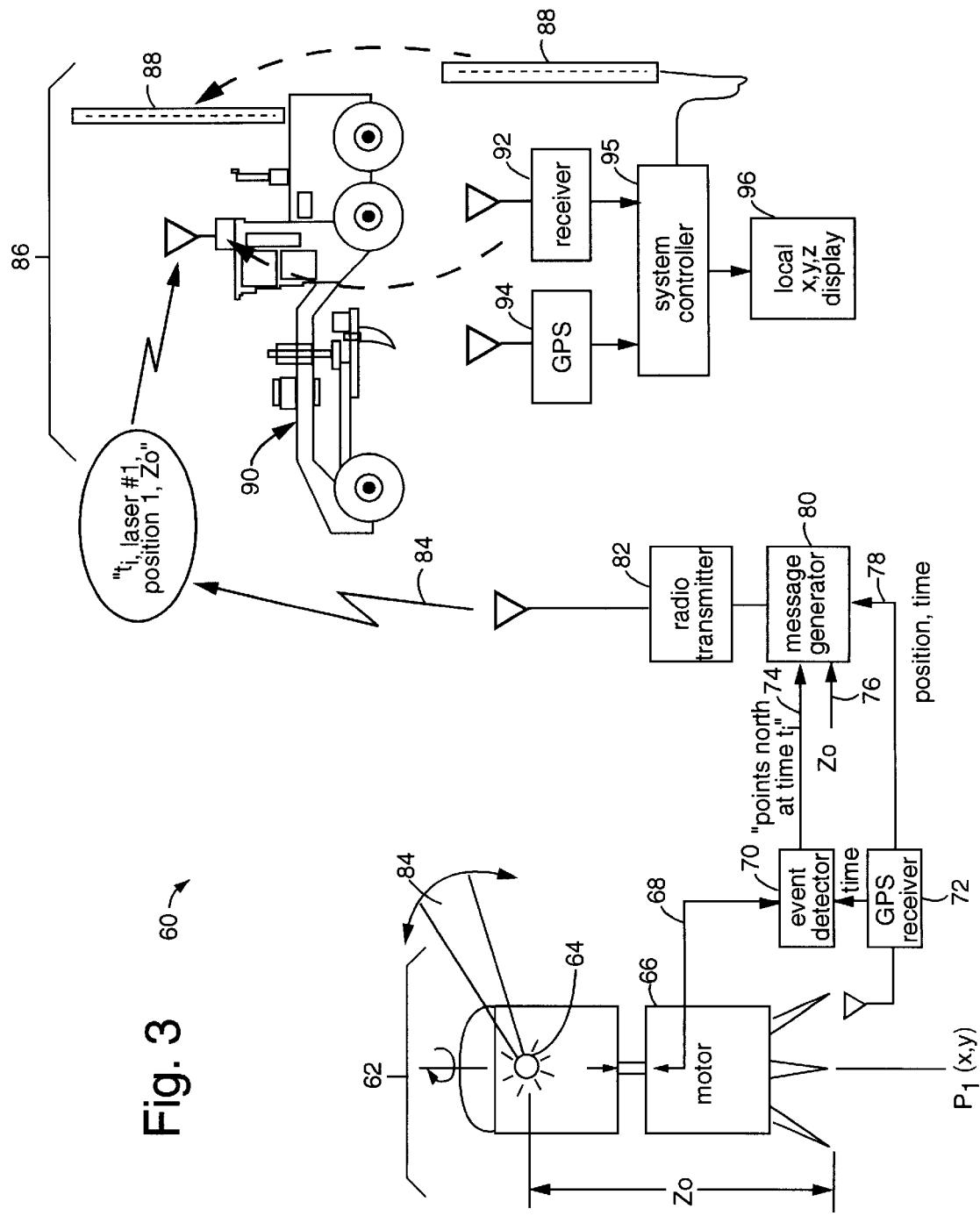
FIG. 3 is a block diagram of a rotating laser reference system with a point sensor used to identify the beacon to a piece of construction equipment with a radio tick.

FIG. 3 shows a system 60 that includes a rotating laser beacon 62. A laser source 64 is located such that it will sweep an elevational plane at a height "Zo". A motor 66 spins the laser source 64. A compass-point signal 68 is output each time the laser sweeps past a particular compass direction, e.g., north. An event detector 70 receives time information from a GPS receiver 72 and issues a time-tag signal 74 that marks the time the laser swept through north. An elevation data "Zo" 76 and an earth-position data 78 are provided to a message generator 80. A radio transmitter 82 sends support information about a laser beam plane 84 to a mobile unit 86. An optical detector mast 88 is used to make visual observations of the laser signals generated by the beacon 62 and is typically mounted on a piece of construction equipment 90, e.g., an earth grader. A radio receiver 92 is used to recover the operational data transmitted by the radio transmitter 82. A GPS receiver 94 provides position and time data to a system controller 95. The particular vertical spot on the mast 88 which has observed a laser signal is determined by the system controller 95. A laser demodulator extracts informational data from the laser signal. User information for guiding the grader 90 is made available on a display 96.

Figure 4:
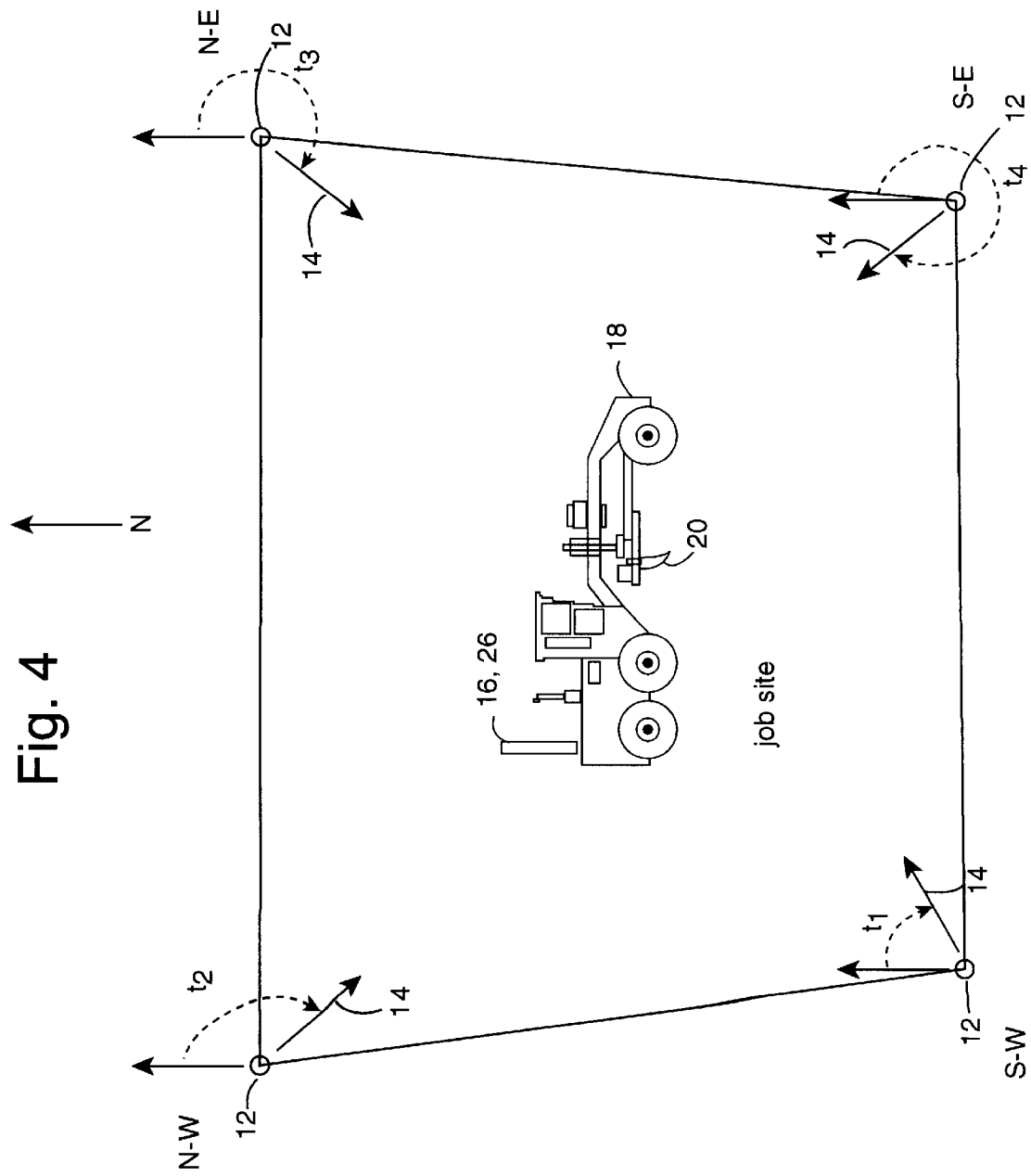
FIG. 4 is a representation of a rectangular construction site with four synchronized-rotation laser beacons located just inside each of the four corners, north-west, north-east, south-west, and south-east.

FIG. 4 illustrates a rectangular construction site with rotating laser beacons 12 of FIG. 1 located just inside of each of the four corners. Assuming a clockwise and synchronous rotation of all the laser beams 14, a construction equipment (grader) 18 at any point in the job site will respectively receive each laser beam in each quarter period of the beam rotation time period. The laser beacon 14 in the south-west corner will be seen first in the first quarter. The laser beacon 14 in the north-west corner will be seen second in the second quarter period. The laser beacon 14 in the north-east corner will be seen third in the third quarter. And, the laser beacon 14 in the south-east corner will be seen last in the fourth quarter.

When a rotating laser beacon 12 must be positioned deep in the interior of the job site, it is still possible to estimate the likely intercept time of its laser beam 14 and thereby uniquely determine which rotating laser beacon 12 was detected. Once the intercepted beam 14 is used to determine the relative distance of the blade or scoop 20 to the reference elevation, the necessary position adjustment can be ascertained from the construction plan.

An alternative means for establishing when the rotating laser beams 14 are pointing north includes using a color-coded strobe light mounted atop each laser beacon 12 and that flashes as the rotating beam 14 sweeps through north. An optical sensor with a color filter can then be used to detect such synchronizing pulse. Alternative to the use of colors, a different strobe flash pattern could be used for each beacon 12.

When a radio system is not available or not practical, a form of meteor burst communication (MBC) can be used to transfer identifying and other useful data from the beacon 12. See for example, Donald L. Schilling, "Meteor Burst Communications: Theory and Practice," John Wiley & Sons, 1993, ISBN: 0471522120; and also, Jacob Z. Schanker, "Meteor Burst Communications," Artech House, 1990, ISBN: 089006444X. In the original MBC system proposed to take advantage of ionized meteor trails in the upper atmosphere to do over-the-horizon radio communication, one station continually "probes" the atmosphere for usable meteorite trails. The usable life of a trail is typically measured in milliseconds, with the wait between usable trails ranging from seconds to minutes depending upon daily and annual meteor cycles. Once the probing station detects a trail with a usable life cycle and an appropriate radiating pattern, the station in the system which can use this trail, sends a "burst" of the information it stored for delivery on the next available trail. The information throughput is dependent on factors including transmitting power, operating frequency, range to the receiver, data encoding scheme, data exchange rate, etc. The system takes all of these factors into account for calculating a usable trail. The embodiments of the present invention would therefore adapt MBC to the situation illustrated in FIG. 1. Various conventional methods can be used to achieve and maintain burst synchronization, including post processing and using tracking loops to maintain clock and frame synchronization from burst to burst.

Another way to allow each equipment package 26 to discriminate amongst laser beacons 12 is to uniquely color-code the laser beams 14 emitted by each by taking advantage of the monochromatic nature of laser light. For example, Fermionics Lasertech produces eight different laser diodes in standard product configurations that each have different monochromatic wavelengths. Optical filters or color CCD-sensors can be used at the receiving end to determine the wavelength of any light beam received. Each laser beacon 12 is associated with a unique wavelength, and the equipment package 26 can then sort out which laser beam 14 came from which laser beacon 12 by its wavelength or color.

Table I lists eight of the wavelengths of standard laser diodes that are currently being marketed by Fermionics Lasertech (see, http://www.fermionics.com). Such laser diodes could be easily used to identify particular laser sources by "color" to optical detectors, and thus provide a simple way to discriminate amongst transmitters on a common jobsite.

TABLE I

| LCX-980 | 980 nm laser diode |
|---|---|
| LCX-1060 | 1060 nm laser diode |
| LCX-1300 | 1300 nm laser diode |
| LCX-1480 | 1480 nm laser diode |
| LCX-1550 | 1550 nm laser diode |
| LCX-1640 | 1640 nm laser diode |
| LCX-1320-H | 1320 nm high power laser diode |
| LCX-1570-H | 1570 nm high power laser diode |

On-the-fly real-time-kinematic (OTF-RTK) equipment can generally help meet only the horizontal requirements of fine grading. The typical vertical requirement of five millimeters is too demanding of GPS-only solutions. So rotating lasers are deployed and integrated in embodiments of the present invention to meet the vertical excavation requirements. In two method embodiments of the present invention, multiple lasers operating in close proximity are nevertheless uniquely identifiable.

In a first embodiment, a laser network is setup, either on a site or linear project. Prior art rotating lasers are used. No two lasers which are in close proximity have a vertical reference elevation any closer than twenty centimeters, for example. A rough "XY" position is established for each laser, e.g., to within two meters of true horizontal position. An "XYZ" earth position from a GPS receiver is loaded in a positioning software on each machine, for example with a keyboard input or using a radio link. A computer program is used to choose a laser that was optimum for a particular machine at its current XY-position. The Z-component, elevation or height, derived by an RTK-type navigation or survey device, is used to drive a laser detector to a predetermined height. Such beam elevation is maintained in a network database. Once the laser detector, such as an optical mast, is pre-positioned, the search for the expected signals should be rather quick. A benefit of this is once the laser is detected, such elevation can be used as a vertical constraint to allow the RTK-type navigation or survey device to continue operation even when it is able to track as few as three satellites.

In a second embodiment, the elevation information for each laser is carried in the way the laser is modulated. This allows an observing machine to immediately understand the true elevation of any beam it happens to be tracking. So an accurate vertical determination from a GPS receiver is not necessary. Such then allows a less expensive, carrier-smoothed GPS receiver to provide the solutions for the horizontal components.

Both such method embodiments allow multiple machines to work seamlessly and simultaneously on a site or along a linear project. This approach allows rough grading to be done with an RTK-GPS based system, and then just add the laser network to do the fine grading with the same system. Both methods allow the positioning system to incorporate the elevation as another range to allow GPS positioning with as few as three satellites.

The goal is to make use of multiple lasers on a construction site to provide well known elevation reference planes from which to perform site earth moving actions. The lasers deliver a series of reference planes whose elevations on the site are known to within millimeters relative to some predetermined reference point on the construction site.

GPS technology has presently advanced to the point where real-time kinematic (RTK) GPS technology permits height determinations to within four to five centimeters. For instance, see U.S. Pat. Nos. 5,519,620, and 5,471,218, issued to Nicholas C. Talbot, et al., which are incorporated herein by reference. If the laser elevations on a construction site are chosen so that they are separated, for example, by at least six to ten centimeters in relative height, then it would be possible to equip earth moving vehicles and their elevation measurement systems with RTK-mode GPS receivers to help sort out which beams are being received when the beams would otherwise appear to be indistinguishable. Each beam intercepted and identified this way can then be used to guide the earth-moving equipment to vertical accuracies that are far better than that obtainable with RTK-mode GPS systems.

It may also be possible to reduce the minimum vertical separation distances between laser beams to the limit of optical resolution of the vertical light receptor system, perhaps as little as 0.25 inch. If all the lasers used on a construction site are ordered in a series of known elevations, then the top or bottom one could be used as a starting count to identify each of the beams in between. Such a system would be similar to a Ronchi ruling, or reference grating. But in order to keep things simple, a preferred approach is to use a minimum separation within the resolution capabilities of an RTK-mode GPS system, e.g., greater than six centimeters. Such separation elevations can easily accomplished with adjustable tripods or other conventional mounting systems for the laser systems.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A multiple-laser elevation-reference system, comprising:
   a plurality of light beacons that each generate a reference-plane of laser light over a job site area by rotating a laser light source;
   a signal system associated with a particular one of the plurality of light beacons, and providing for the detection of when a corresponding said laser light source is rotated past a reference direction, and further providing for a communication signal to be transmitted that includes information related to when said laser light source was rotated past said reference direction;
   a mobile unit for operation on said job site area and having a light detector for intercepting and sensing said laser light source; and
   a receiver mounted to the mobile unit and providing for reception of said communication signal;
   wherein, the signal system modulates at least one laser light source and uses meteor burst communication technology to transfer information from a light beacon to a mobile unit during a brief time a communication contact exists.

2. The system of claim 1, further comprising:
   a discriminator connected to said light detector and the receiver and providing for an identification of particular ones of the plurality of light beacons by a comparison of when a corresponding laser light from said rotating laser light source was intercepted and sensed by said light detector, and that interprets an elevation of the mobile unit from said reference-plane of laser light.

3. The system of claim 1, wherein:
   the signal system modulates said at least one laser light source with data that identifies a particular one of the plurality of light beacons.

4. A multiple-laser elevation-reference system, comprising:
   a plurality of light beacons that each generate a reference-plane of laser light over a job site area by rotating a laser light source;
   a signal system associated with a particular one of the plurality of light beacons, and providing for the detection of when a corresponding said laser light source is rotated past a reference direction, and further providing for a communication signal to be transmitted that includes information related to when said laser light source was rotated past said reference direction;
   a mobile unit for operation on said job site area and having a light detector for intercepting and sensing said laser light source; and
   a receiver mounted to the mobile unit and providing for reception of said communication signal;
   wherein, the signal system includes a position sensor switch connected to sense a particular point of rotation of said laser light source.

5. A multiple-laser elevation-reference system, comprising:
   a plurality of light beacons that each generate a reference-plane of laser light over a job site area by rotating a laser light source;
   a signal system associated with a particular one of the plurality of light beacons, and providing for the detection of when a corresponding said laser light source is rotated past a reference direction, and further providing for a communication signal to be transmitted that includes information related to when said laser light source was rotated past said reference direction;
   a mobile unit for operation on said job site area and having a light detector for intercepting and sensing said laser light source; and
   a receiver mounted to the mobile unit and providing for reception of said communication signal;
   wherein, the plurality of light beacons are each distributed at the corners of said job site and their respective laser light sources are rotated in synchronism.

6. The system of claim 5, further comprising:
   a discriminator connected to said light detector and the receiver and providing for an identification of particular ones of the plurality of light beacons and a means for recognizing that each light beacon during a unique time window, and further providing for an interpretation of an elevation of the mobile unit from said corresponding reference-plane of laser light.

7. A method for identifying a plurality of lasers on a work site in an unambiguous manner, comprising the steps of:
   rotating a first laser beam of light from a first beacon at a first location at a first particular elevation through a first plane;
   simultaneously rotating a second laser beam of light from a second beacon at a second location at a second particular elevation through a second plane during a time period when said first laser beam of light is being rotated, wherein said second locations and particular elevations are different from said first locations and particular elevations, and wherein a portion of said first and second laser beams of light respectively within said first and second planes overlaps;

receiving at least one of said first and second laser beams of light respectively within said first and second planes;

discriminating between said first and second laser beams of light to determine a relative vertical location of a mobile unit to at least one of said first and second particular elevations and planes; and optically modulating said first and second laser beams of light with data that respectively identifies said first and second beacons as a corresponding source; and optically demodulating said first and second laser beams of light to determine which of said first and second beacons has been observed.

8. A method for identifying a plurality of lasers on a work site in an unambiquous manner, comprising the steps of:

rotating a first laser beam of light from a first beacon at a first location at a first particular elevation through a first plane;

simultaneously rotating a second laser beam of light from a second beacon at a second location at a second particular elevation through a second plane during a time period when said first laser beam of light is being rotated, wherein said second locations and particular elevations are different from said first locations and particular elevations, and wherein a portion of said first and second laser beams of light respectively within said first and second planes overlaps;

receiving at least-one of said first and second laser beams of light respectively within said first and second planes;

discriminating between said first and second laser beams of light to determine a relative vertical location of a mobile unit to at least one of said first and second particular elevations and planes; and compass synchronizing the rotations of said first and second laser beams of light such that they sweep in the same direction and through the same compass points at the same times; and marking the time of each observation of said first and second laser beams of light at said mobile unit to determine which of said first and second beacons has been observed.

9. A method for identifying a plurality of lasers on a work site in an unambiguous manner, comprising the steps of:

rotating a first laser beam of light from a first beacon at a first location at a first particular elevation through a first plane;

simultaneously rotating a second laser beam of light from a second beacon at a second location at a second particular elevation through a second plane during a time period when said first laser beam of light is being rotated, wherein said second locations and particular elevations are different from said first locations and particular elevations, and wherein a portion of said first and second laser beams of light respectively within said first and second planes overlaps;

receiving at least one of said first and second laser beams of light respectively within said first and second planes;

discriminating between said first and second laser beams of light to determine a relative vertical location of a mobile unit to at least one of said first and second particular elevations and planes; and optically modulating said first and second laser beams of light with data that respectively describes said first and second elevations of said first and second beacons; and optically demodulating at said mobile unit said first and second laser beams of light to obtain information related to either said first and second elevation of said first and second beacons.

10. A method for identifying a plurality of lasers on a work site in an unambiguous manner, comprising the steps of:

rotating a first laser beam of light from a first beacon at a first location at a first particular elevation through a first plane;

simultaneously rotating a second laser beam of light from a second beacon at a second location at a second particular elevation through a second plane during a time period when said first laser beam of light is being rotated, wherein said second locations and particular elevations are different from said first locations and particular elevations, and wherein a portion of said first and second laser beams of light respectively within said first and second planes overlaps;

receiving at least one of said first and second laser beams of light respectively within said first and second planes;

discriminating between said first and second laser beams of light to determine a relative vertical location of a mobile unit to at least one of said first and second particular elevations and planes;

radio-transmitting timing-information related to an instantaneous compass direction of said first and second laser beams of light;

receiving a radio-transmission of timing-information related to said instantaneous compass direction of said first and second laser beams of light; and marking a time delay between said timing-information and each observation of said first and second laser beams of light at said mobile unit to determine which of said first and second beacons has been observed.

11. A method for identifying a plurality of lasers on a work site in an unambiguous manner, comprising the steps of:

rotating a first laser beam of light from a first beacon at a first location at a first particular elevation through a first plane;

simultaneously rotating a second laser beam of light from a second beacon at a second location at a second particular elevation through a second plane during a time period when said first laser beam of light is being rotated, wherein said second locations and particular elevations are different from said first locations and particular elevations, and wherein a portion of said first and second laser beams of light respectively within said first and second planes overlaps;

receiving at least one of said first and second laser beams of light respectively within said first and second planes;

discriminating between said first and second laser beams of light to determine a relative vertical location of a mobile unit to at least one of said first and second particular elevations and planes;

radio-transmitting satellite-navigation-receiver-obtained position and time-of-day information related to a three-dimensional earth position of said first and second beacons;

receiving at said mobile unit a radio-transmission of said three-dimensional earth positions of said first and second beacons; and obtaining at said mobile unit a satellite-navigation-receiver position and time-of-day information related to a three-dimensional earth position of said mobile unit to determine which of said first and second beacons has been observed at said mobile unit.

12. A method for discriminating amongst a network of overlapping rotating lasers, the method comprising:

placing at least two rotating lasers with dissimilar "XY" horizontal positions and separated "Z" elevations, and also placed within range of a mobile machine-controller that needs to discriminate amongst a plurality of laser signal received from said rotating lasers;

establishing a rough "XY" position of true horizontal position for each rotating laser;

loading an "XYZ" earth position from a navigation satellite receiver into in said mobile machine-controller;

determining which rotating laser to observe from said mobile machine-controller according to an a prior knowledge of the "Z" elevation of each said rotating laser and a "Z" elevation of said mobile machine-controller obtained in the step of loading;

driving a laser detector connected to said mobile machine-controller to a vertical height estimated to cause an interception of a beam of light from a particular one of said rotating lasers; and constraining said navigation satellite receiver with said a prior knowledge of the "Z" elevation of said particular one of said rotating lasers to provide for an improvement of said "XYZ" earth position or the ability to continue to operate with fewer than four satellites being simultaneously tracked by said navigation satellite receiver.

* * * * *